United States Patent
Kim et al.

(10) Patent No.: US 8,485,139 B2
(45) Date of Patent: Jul. 16, 2013

(54) APPARATUS FOR VISUALLY INSPECTING AND REMOVING FOREIGN OBJECT IN GAPS OF BUNDLE OF HEATING TUBES OF UPPER PORTION OF TUBE SHEET OF SECONDARY SIDE OF STEAM GENERATOR

(75) Inventors: Gyungsub Kim, Suwon-si (KR); Jangmyong Woo, Yongin-si (KR); Sanghoon Choi, Yongin-si (KR); Nakjeom Kim, Yongin-si (KR); Minsu Park, Yongin-si (KR); Dongil Kim, Yongin-si (KR)

(73) Assignee: Korea Plant Service & Engineering Co., Ltd., Gyeonggi-do (KR)

( * ) Notice: Subject to any disclaimer, the term of this patent is extended or adjusted under 35 U.S.C. 154(b) by 934 days.

(21) Appl. No.: 12/575,660

(22) Filed: Oct. 8, 2009

(65) Prior Publication Data

US 2011/0000643 A1  Jan. 6, 2011

(30) Foreign Application Priority Data

Jul. 1, 2009 (KR) ........................ 10-2009-0059646

(51) Int. Cl.
*F28G 15/00* (2006.01)
*F28G 15/02* (2006.01)
*F28G 15/04* (2006.01)
*F22B 37/00* (2006.01)

(52) U.S. Cl.
USPC ........... 122/379; 122/383; 122/390; 122/396; 122/405; 165/95; 165/11.2

(58) Field of Classification Search
USPC ....................... 122/383, 379, 390, 396, 405
See application file for complete search history.

(56) References Cited

U.S. PATENT DOCUMENTS

| | | | | |
|---|---|---|---|---|
| 4,385,523 A | * | 5/1983 | Gugel et al. | 73/640 |
| 5,782,209 A | * | 7/1998 | Vandenberg | 122/379 |

(Continued)

FOREIGN PATENT DOCUMENTS

| | | |
|---|---|---|
| JP | 2001013288 | 1/2001 |
| KR | 1020000011208 A | 2/2000 |
| KR | 1020050064622 A | 6/2005 |

OTHER PUBLICATIONS

Japanese Office Action (with English translation) dated Sep. 24, 2012 for Japanese application No. 2009235497.

(Continued)

*Primary Examiner* — Steven B McAllister
*Assistant Examiner* — Nathaniel Herzfeld
(74) *Attorney, Agent, or Firm* — Ohlandt, Greeley, Ruggiero & Perle, LLP

(57) ABSTRACT

Provided is an apparatus for inspecting a structure including a heating tube, a tube sheet supporting the heating tube, and a flow distribution baffle, which are installed in a steam generator of a nuclear power plant, and more particularly, an apparatus for visually inspecting and removing a foreign object in gaps of a bundle of heating tubes of an upper portion of a tube sheet of a secondary side of a steam generator, in which a detector is inserted into gaps of a bundle of heating tubes of an upper portion of a secondary side of a steam generator so as to inspect sludge or foreign objects, and a foreign object remover removes foreign objects when foreign objects are discovered in the gaps of the heating tubes.

14 Claims, 19 Drawing Sheets

U.S. PATENT DOCUMENTS

| | | | | |
|---|---|---|---|---|
| 6,513,462 B1* | 2/2003 | Shiraishi et al. | | 122/382 |
| 7,367,288 B2* | 5/2008 | Kim | | 122/379 |
| 2004/0083986 A1* | 5/2004 | Ashton et al. | | 122/379 |
| 2005/0235927 A1* | 10/2005 | Hwang et al. | | 122/379 |
| 2009/0010378 A1* | 1/2009 | Haberman | | 376/316 |

OTHER PUBLICATIONS

Korean Office Action (with English translation) dated Mar. 1, 2011 for Korean application No. 20090059646.

* cited by examiner

APPARATUS FOR VISUALLY INSPECTING AND REMOVING FOREIGN OBJECT IN GAPS OF BUNDLE OF HEATING TUBES OF UPPER PORTION OF TUBE SHEET OF SECONDARY SIDE OF STEAM GENERATOR

CROSS-REFERENCE TO RELATED PATENT APPLICATION

This application claims the benefit of Korean Patent Application No. 10-2009-0059646, filed on Jul. 1, 2009, in the Korean Intellectual Property Office, the disclosure of which is incorporated herein in its entirety by reference.

BACKGROUND OF THE INVENTION

1. Field of the Invention

The present invention relates to an apparatus for inspecting a structure including a heating tube, a tube sheet supporting the heating tube, and a flow distribution baffle, which are installed in a steam generator of a nuclear power plant, and for removing a foreign object, and more particularly, to an apparatus for visually inspecting and removing a foreign object in gaps of a bundle of heating tubes of an upper portion of a tube sheet of a secondary side of a steam generator, in which a detector is inserted into gaps of a bundle of heating tubes of an upper portion of a secondary side of a steam generator so as to inspect sludge or foreign objects, and a foreign object remover removes foreign objects when foreign objects are discovered in the gaps of the heating tubes.

2. Description of the Related Art

Generally, a steam generator is one of main facilities required to produce power from a steam turbine and a power generator in a nuclear power plant.

In detail, a plurality of heating tubes formed in a bundle are disposed in the steam generator. The heating tube performs as a heat exchanger between primary system water containing radioactivity and secondary system water turning a turbine, and separates the primary system water from the secondary system water.

Steam is generated as follows. The primary system water heated while passing through a nuclear reactor flows through a path in the heating tube of the steam generator. The secondary system water provided out of the heating tube contacts an external wall of the heating tube. Thus, heat exchange is performed between the primary system water and the secondary system water. The primary system water flows through the path of the heating tube, and circulates through the nuclear reactor. In addition, the secondary system water is changed to steam.

That is, radioactive water (i.e., the primary system water) with high temperature and pressure flows in the heating tube, and nonradioactive water (i.e., the secondary system water) flows out of the heating tube, wherein a wall of the heating tube is disposed between the primary system water and the secondary system water. Thus, if the heating tube is damaged, the radioactive water (i.e., the primary system water) flowing through the heating tube may be mixed with the nonradioactive water (i.e., the secondary system water) to be contaminated while leaking out of the heating tube, and thus radioactive contamination may occur throughout a space to which steam changed from the nonradioactive water (i.e., the secondary system water) is provided. Accordingly, it is most important to ensure reliability of heating tubes in various operations in a nuclear power plant.

FIG. 1 is a cross-sectional view of a conventional steam generator 10. FIG. 2A is a front cross-sectional view of the steam generator 10 of FIG. 1. FIG. 2B is a cross-sectional view for explaining a mechanism of the steam generator 10 of FIG. 1.

Referring to FIGS. 1, 2A and 2B, the steam generator 10 includes an inlet nozzle 1 into which a reactor coolant of a primary system flows, a heating tube 3 where heat exchange is performed, and an outlet nozzle 5 transferring heat from the reactor coolant flowing into the inlet nozzle 1 to a reactor coolant of a secondary system disposed out of the heating tube 3. The heating tube 3 is mounted on a tube sheet 4, and is supported by tube support plates 6 that are vertically arranged at predetermined intervals. A flow distribution baffle 8 shaped like a doughnut plate is installed between the lowest tube support plate 6 and the tube sheet 4 so as to support the heating tube 3. The heating tube 3, and the tube support plate 6 that are vertically arranged at predetermined intervals so as to support the heating tube 3 are coupled to a wrapper 20 of which a lower portion is opened and of which an upper portion has a steam outlet 21. Water is provided into the lower portion of the wrapper 20 along an inner wall of an external housing 2. The provided water generates steam by the heating tube 3, and then the steam is discharged upwards.

The steam generator 10 having the above-described structure generates heat as follows: the reactor coolant of the primary system flows through the inlet nozzle 1 in the heating tubes 3, passes through the outlet nozzle 5, and transfers heat to the reactor coolant of the secondary system disposed out of the heating tubes 3, thereby generating steam.

A portion of the steam generator 10 where a reactor coolant flows is referred to as a primary side, and a portion of the steam generator 10 where water is fed and steam flows is referred to as a secondary side. The secondary side of the steam generator 10 includes a main steam system, a turbine system, a condensate water system, and a feed-water system.

Thus, steam generated by the secondary side of the steam generator 10 moves through a main steam tube, and turns a turbine.

However, conventionally, when the steam generator 10 generates steam, although secondary water is filtered and chemically-treated so as to be provided to the secondary side, the secondary water accompanied with foreign objects and sludge which are generated due to various reasons while circulating in the heating tube 3 flows into the steam generator 10. Thus, the foreign objects and sludge may be deposited onto the tube sheet 4, the tube support plate 6, the flow distribution baffle 8, etc. or may be stuck to an external wall of the heating tube 3, thereby reducing heating efficiency of the steam generator 10 or damaging the steam generator 10.

That is, the steam generator 10 has a structure in which several thousands of U-shaped heating tubes 3 are disposed in a bundle type, both ends of the heating tube 3 are fixed to the tube sheet 4, and the heating tube 3 are supported by the tube support plates 6 that are vertically arranged so as to have seven steps at an interval of about 1 m up to an upper portion of the heating tube 3, as illustrated in FIG. 2. Impurities as scale generated due to various reasons when driving soft water flows are stuck to a surface of the heating tube 3, thereby reducing heat-exchange efficiencies. The impurities are deposited as sludge and are gradually solidified between the heating tube 3 and the tube support plate 6, and thus denting occurs between the tube support plate 6 and the heating tube 3, thereby damaging the heating tube 3. Accordingly, it is necessary to remove scale stuck to the surface of the heating tube 3 and sludge deposited on the tube support plate 6 in order to ensure efficiencies of the steam generator 10 and reliability of the heating tube 3.

To achieve this, a small-sized endoscope camera has been used to check states of the flow distribution baffle 8, the heating tube 3 and the tube sheet 4.

However, an operator needs to manually push the endoscope camera into a gap of a heating tube through a guide tube. Since the endoscope camera does not include an element for supporting the endoscope camera, the endoscope camera cannot find out and check a desired position. In addition, since a steam generator is surrounded by high radioactivity, an operator may be exposed to radioactivity, and therefore it is difficult to visually inspect or remove foreign objects.

SUMMARY OF THE INVENTION

The present invention provides an apparatus for visually inspecting and removing a foreign object in gaps of a bundle of heating tubes of an upper portion of a tube sheet of a secondary side of a steam generator, in which a detector is inserted into a gap of a bundle of heating tubes of an upper portion of a secondary side of a steam generator so as to inspect sludge or foreign objects, and a foreign object remover removes foreign objects when foreign objects are discovered in the gap of the heating tube.

Additional aspects will be set forth in part in the description which follows and, in part, will be apparent from the description, or may be learned by practice of the presented embodiments.

According to an aspect of the present invention, there is provided an apparatus for visually inspecting and removing a foreign object in gaps of a bundle of heating tubes of an upper portion of a tube sheet of a secondary side of a steam generator, the apparatus including: a mounting fixture fixed to a flange surface of a hand hole of the steam generator by a bolt; a guide rail of which one side is fixed to the mounting fixture, wherein a first end of the guide rail is coupled to a center stay rod disposed at a central portion of the steam generator, and a second end of the guide rail is coupled to a driver; a detector coupled to a lower end of the guide rail so as to slide on the lower end of the guide rail, inserted into the steam generator by a moving belt, and visually inspecting and removing a foreign object; the driver supplying power to the detector, wherein one side of the driver is coupled to the guide rail, and is simultaneously coupled to a rail supporter of the mounting fixture; and local and remote controllers adjacent to the steam generator and controlling the mounting fixture, the detector and the driver.

The mounting fixture may include a flange having four bolts installed therein so as to fix the mounting fixture to the flange surface of the hand hole of the steam generator; a panning plate of which a front surface is coupled to the flange so as to slide in a lateral direction of the flange; a tilting lever hinged to a rear surface of the panning plate so as to optionally tilt; the rail supporter coupled to the tilting lever and supporting the guide rail; and two cable guides disposed on a rear surface of the tilting lever so as to stably accommodate cables from the detector therein and to prevent the cables from being entangled and damaged.

The flange may include screw holes formed therein into which the four blots are inserted, respectively, so as to fix the mounting fixture to the flange surface of the steam generator, wherein the screw holes each having a circular shape may be formed in four edges of flange, and the mounting fixture may roll by optionally rotating the flange and then coupling the four bolts to the screw holes, respectively.

The flange and the panning plate may include respective connectors, which have corresponding shapes to each other and are formed on surfaces of the flange and the panning plate, which come in contact with each other, the flange and the panning plate may be coupled by sliding the flange and the panning plate on each other, and the panning plate may move right and left by a control pin disposed at both sides of the flange.

The tilting lever may include a knuckle joint having a first end in contact with the panning plate, and a second end with a screw thread formed thereon; and a control bolt coupled to the screw thread formed on the second end of the knuckle joint, wherein the tilting lever may tilt by a manner in which the control bolt rotates around the knuckle joint to push the knuckle joint.

The rail supporter may include a horizontal and vertical level gage installed thereon, wherein the horizontal and vertical level gage checks a change in an angle of right and left rotation of the mounting fixture, and a change in an angle of horizontal and vertical movement of the mounting fixture.

The guide rail may function as a guide of the detector, and may include a plurality of rod-shaped guide rods that are separately coupled to each other.

The guide rail may include a first guide rod including a gripper that is disposed at a first end of the first guide rod so as to support and fix the center stay rod of the steam generator to the guide rail by tightening the center stay rod, and a connecting block having a screw hole and formed at a second end of the first guide rod; a second guide rod including a clamping bolt that is disposed at a first end of the second guide rod and is screwed to the screw hole formed in the connecting block so as to be coupled to the first guide rod, and a connecting block disposed at a second end of the second guide rod and having a screw hole formed in the connecting block; and a third guide rod including a clamping bolt that is disposed at a first end of the third guide rod and is screwed to the screw hole formed in the connecting bolt so as to be coupled to the second guide rod, wherein the driver is coupled to a second end of the third guide rod.

The apparatus may further include a guiding groove formed in a lower portion of the guide rail, wherein the moving belt is inserted into the guiding groove.

The detector may include a detecting portion visually-inspecting and removing sludge or a foreign object in the steam generator, including a photographing sheet and a foreign object remover, and rotating right and left; a detection driving portion supplying power to the detector so as to drive the detecting portion; and a bracket portion connecting the detecting portion to the detection driving portion so as to be coupled to the guide rail.

The detecting portion may include a body installed in front of the bracket portion and including a bobbin disposed in the body; a steel belt disposed in the body and having a first end wound on the bobbin; the photographing sheet coupled to a second end of the steel belt and having an end at which a charge-coupled device (CCD) sensor and a light emitting display device (LED) are installed so as to generate a image signal of a visual inspection; and the foreign object remover installed adjacent to the photographing sheet so as to remove a foreign object checked by the photographing sheet.

The steel belt may include a plurality of coupling holes formed in a center of the steel belt in a longitudinal direction of the steel belt at predetermined intervals, and the steel belt may be wound into the body according to rotation of the bobbin and an intermittent gear having a plurality of protrusions formed on an outer circumference surface of the intermittent gear, wherein the intermittent gear and the bobbin are disposed in the body.

The detection driving portion may include a housing installed at a rear surface of the bracket portion, transferring a driving force to the detecting portion, and coupled to the bracket portion; a tilting motor installed in the housing and supplying power to the detecting portion so as to rotate the detecting portion towards both sides of the detecting portion; and a feeding motor supplying power so that the photographing sheet and the foreign object remover of the detecting portion are extended or reduced out of the body.

The driver may include a main housing having an end coupled to the guide rail and simultaneously coupled to the rail supporter of the mounting fixture, and including a bobbin disposed in the main housing and rotated by a plurality of gears; the moving having a first end wound on the bobbin and a second end coupled to the bracket portion of the detector so as to move along the guide rail; and a driving motor rotating the bobbin disposed in the main housing so that the moving belt is wound or loosened and the detector is moved.

The main housing may include a pinion gear engaged to an intermittent gear having a plurality of protrusions formed on an outer circumference surface of the intermittent gear, the moving belt may include a plurality of through holes formed therein in a longitudinal direction at predetermined intervals, and the plurality of protrusions of the intermittent gear engaged to the pinion gear may be inserted into the plurality of through holes so that the moving belt is wound or loosened on the bobbin.

The apparatus may further include a roller disposed in the main housing and pressurizing the moving belt downwards so that the plurality of protrusions of the intermittent gear engaged to the pinion gear are correctly inserted into the plurality of through holes of the moving belt.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, an apparatus for visually inspecting and removing a foreign object in gaps of a bundle of heating tubes of an upper portion of a tube sheet of a secondary side of a steam generator will be described with regard to exemplary embodiments of the invention with reference to the attached drawings.

Figure 1:
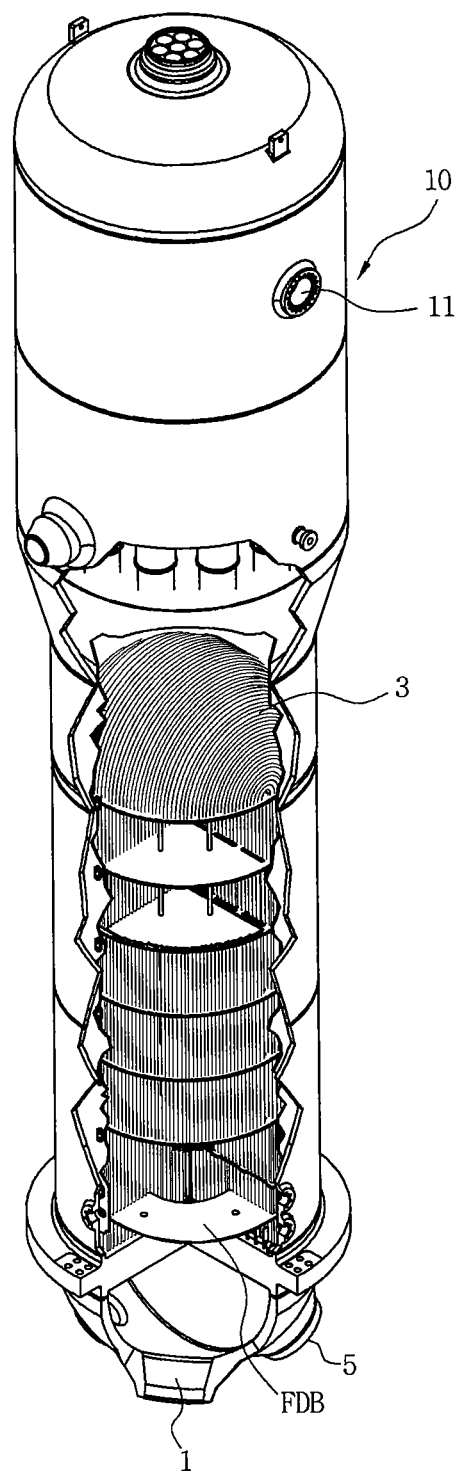
FIG. 1 is a cross-sectional view of a conventional steam generator.
Figure 2A:
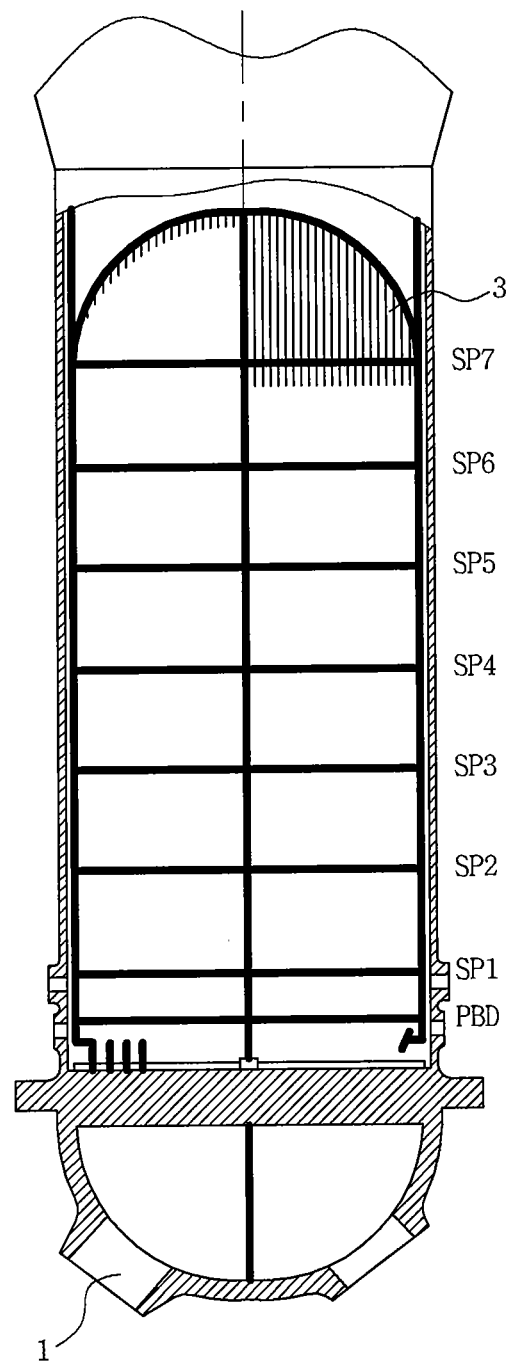
FIG. 2A is a front cross-sectional view of the steam generator of FIG. 1.
Figure 2B:
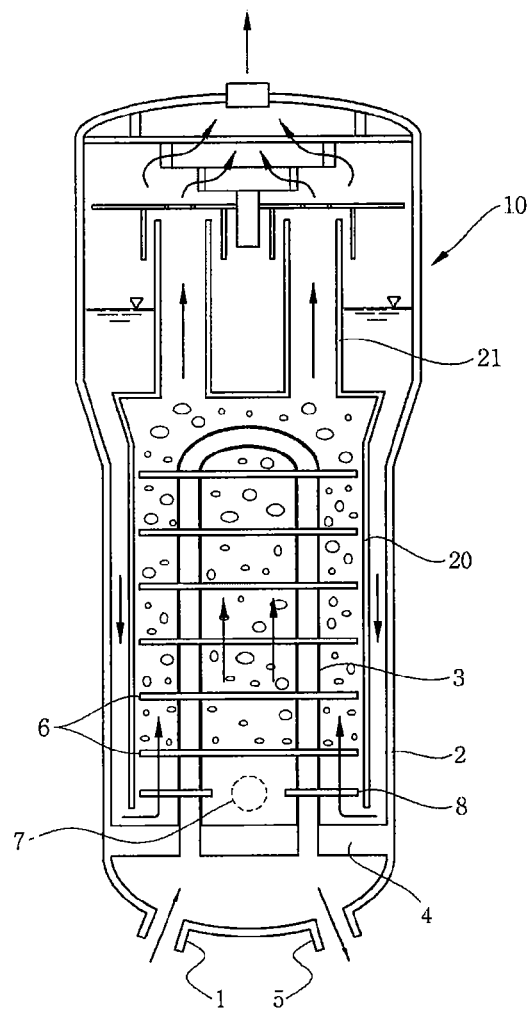
FIG. 2B is a cross-sectional view for explaining a mechanism of the steam generator of FIG. 1.
Figure 3:
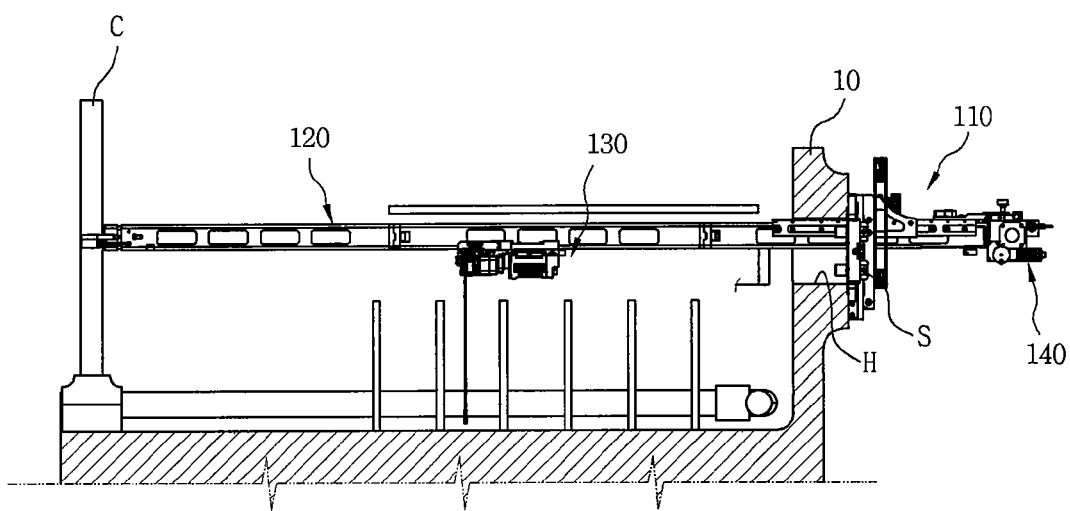
FIG. 3 is a lateral cross-sectional view for explaining a case where an apparatus for visually inspecting and removing a foreign object in gaps of a bundle of heating tubes of an upper portion of a tube sheet of a secondary side of a steam generator is installed, according to an embodiment of the present invention.
Figure 4:
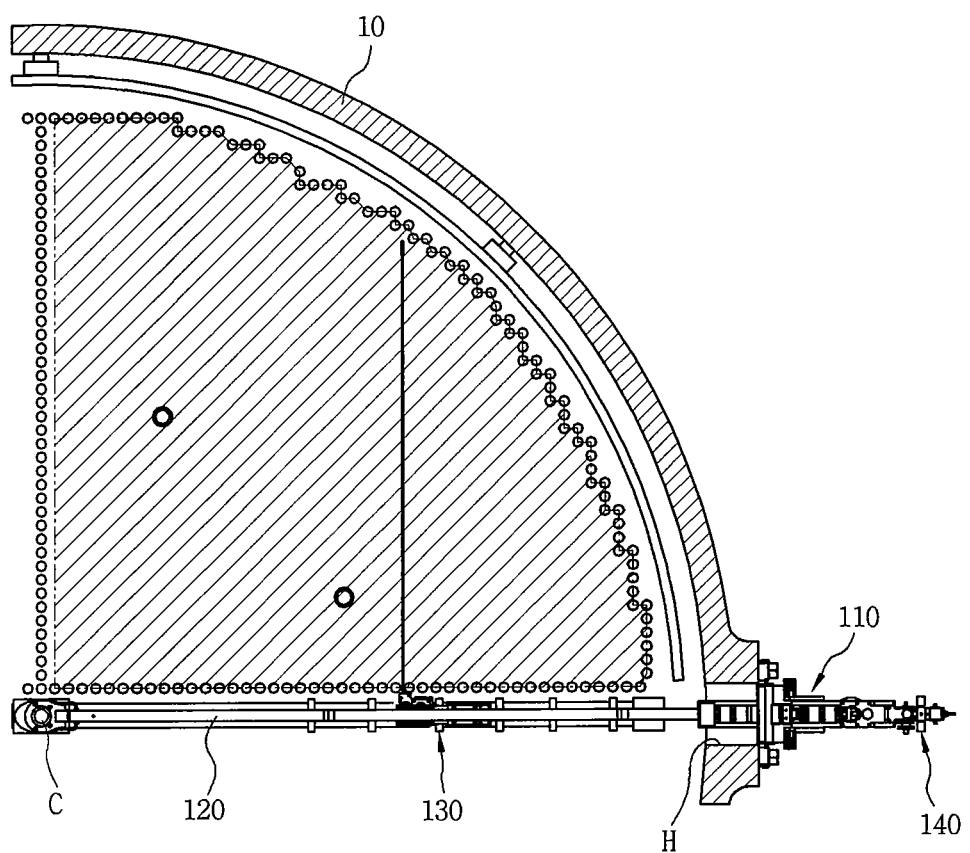
FIG. 4 is a cross-sectional view of FIG. 3.
Figure 5:
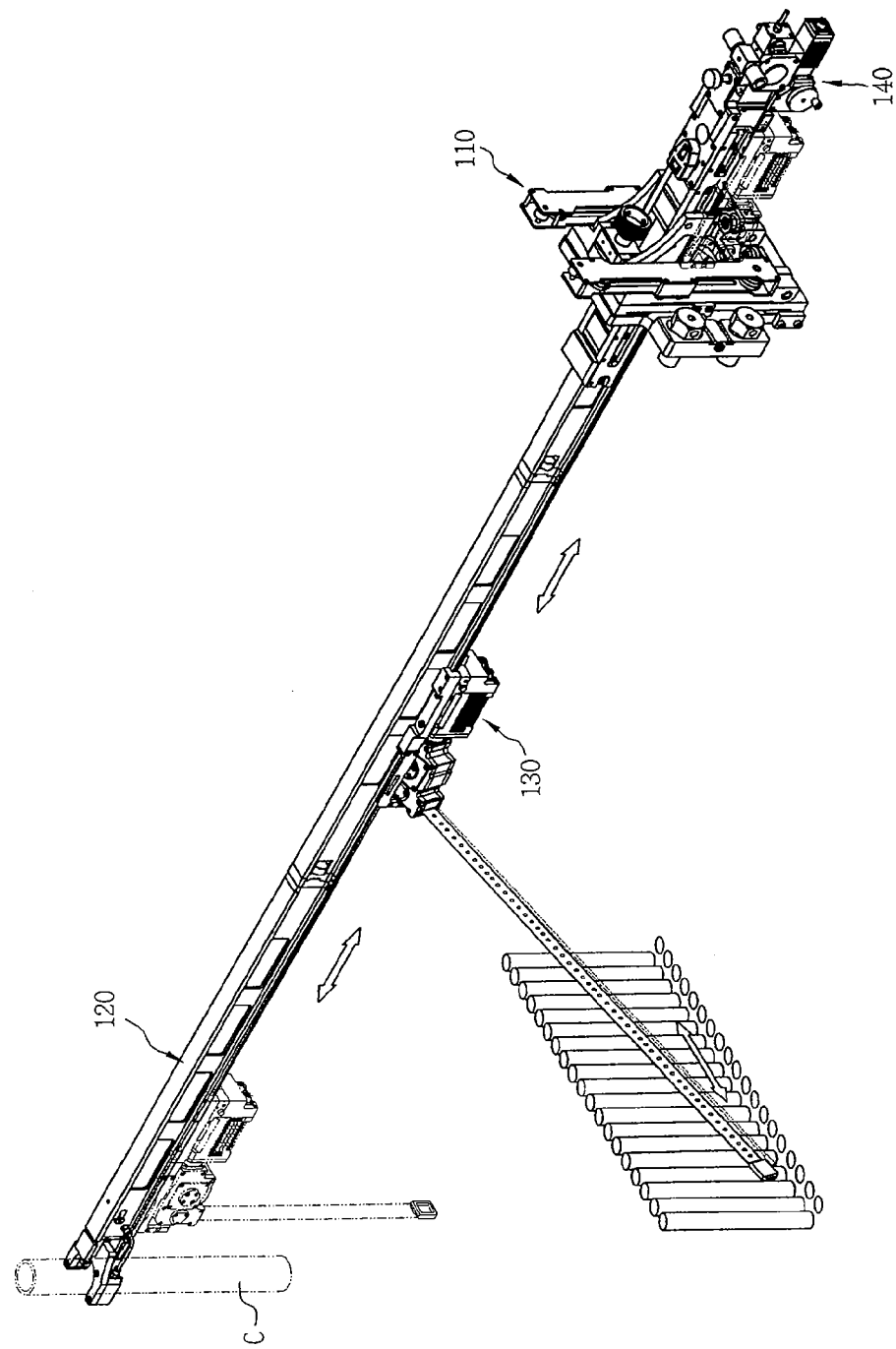
FIG. 5 is a schematic perspective view of an apparatus for visually inspecting and removing a foreign object in gaps of a bundle of heating tubes of an upper portion of a tube sheet of a secondary side of a steam generator, according to an embodiment of the present invention.
Figure 6:
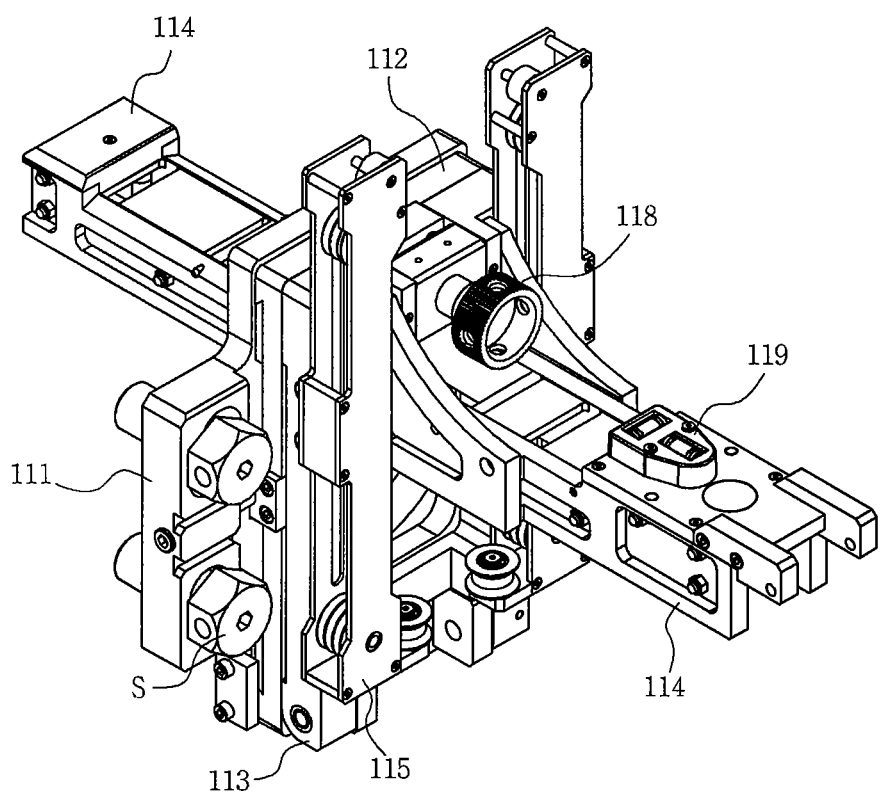
FIG. 6 is a cross-sectional view of a mounting fixture of an apparatus for visually inspecting and removing a foreign object in gaps of a bundle of heating tubes of an upper portion of a tube sheet of a secondary side of a steam generator, according to an embodiment of the present invention.
Figure 7:
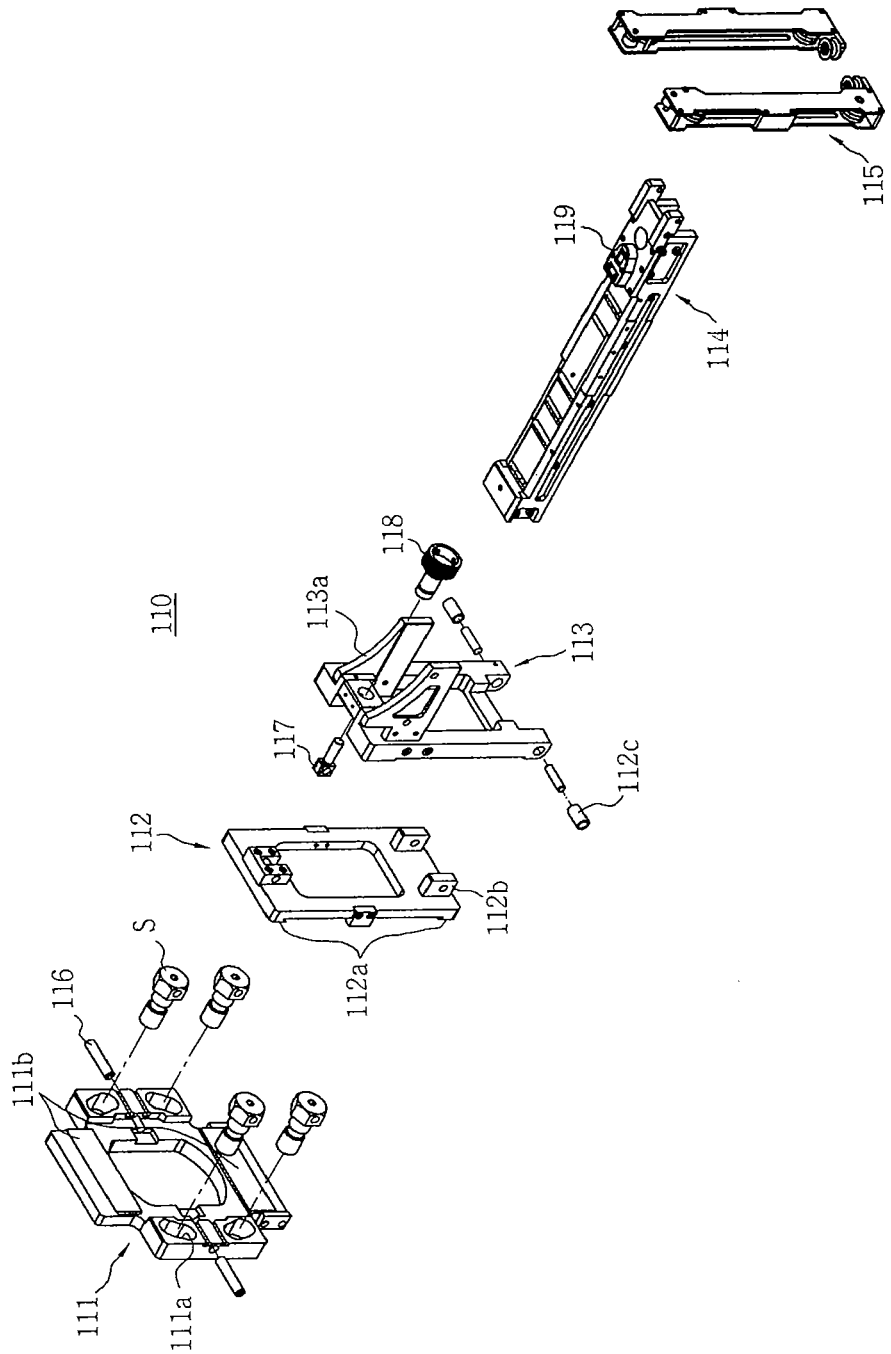
FIG. 7 is an exploded perspective view of FIG. 6.
Figure 8A:
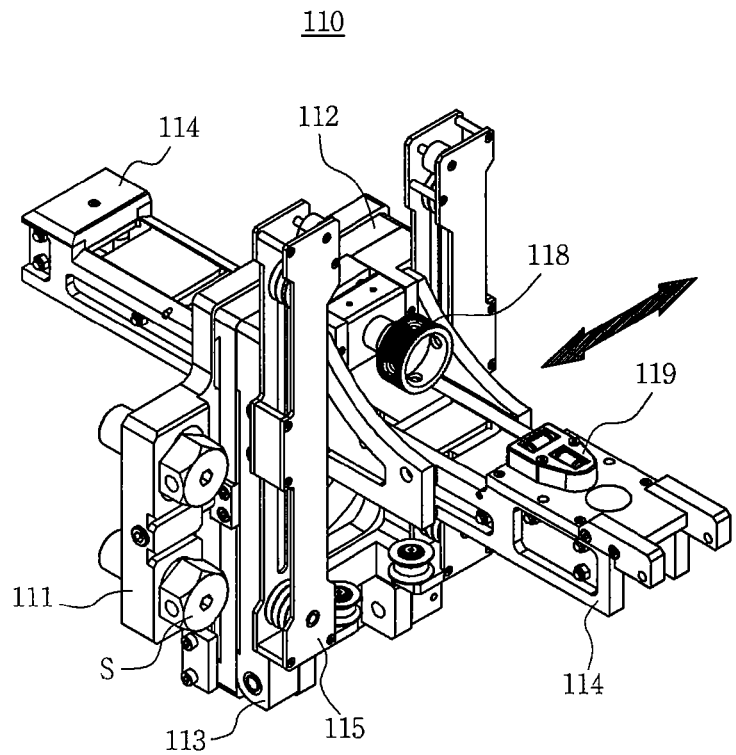
FIGS. 8A through 8C are cross-sectional views for explaining movement of the mounting fixture of FIG. 6, according to an embodiment of the present invention.
Figure 8B:
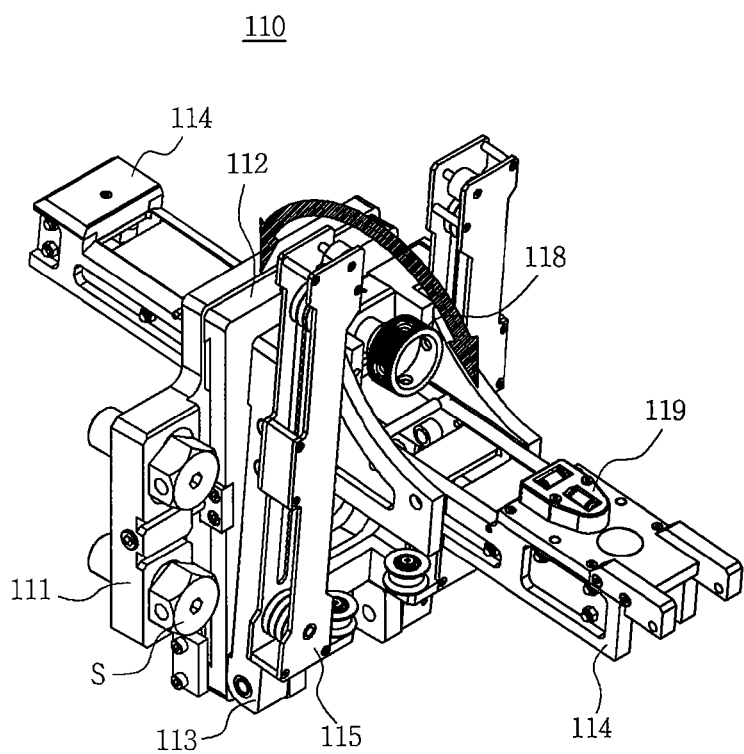
Figure 8C:
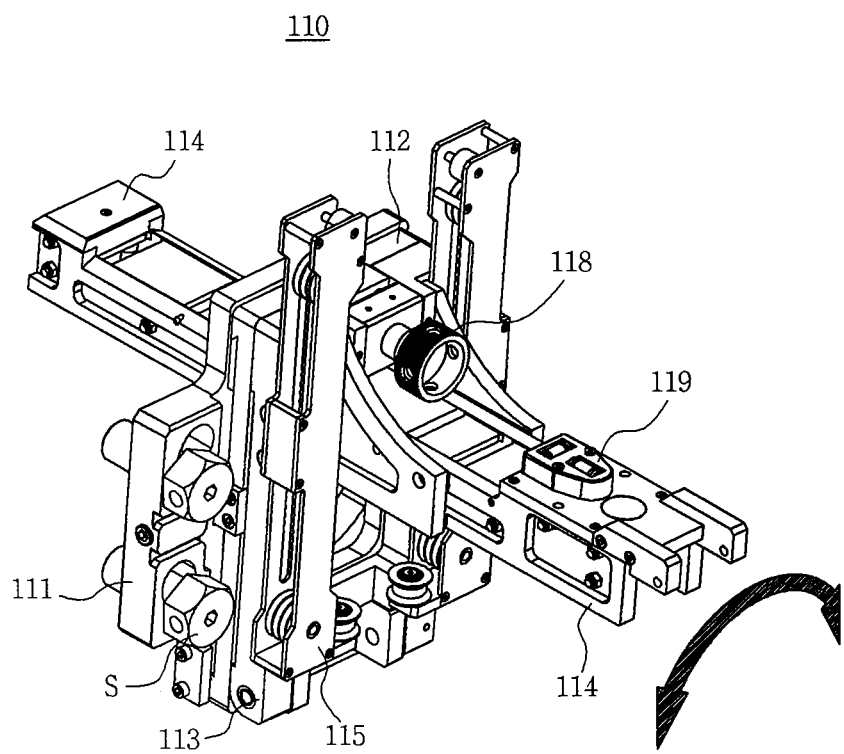

FIG. 3 is a lateral cross-sectional view for explaining a case where an apparatus for visually inspecting and removing a foreign object in gaps of a bundle of heating tubes of an upper portion of a tube sheet of a secondary side of a steam generator is installed, according to an embodiment of the present invention. FIG. 4 is a cross-sectional view of FIG. 3. FIG. 5 is a schematic perspective view of an apparatus for visually inspecting and removing a foreign object in gaps of a bundle of heating tubes of an upper portion of a tube sheet of a secondary side of a steam generator, according to an embodiment of the present invention. FIG. 6 is a cross-sectional view of a mounting fixture 110 of an apparatus for visually inspecting and removing a foreign object in gaps of a bundle of heating tubes of an upper portion of a tube sheet of a secondary side of a steam generator, according to an embodiment of the present invention. FIG. 7 is an exploded perspective view of FIG. 6. FIGS. 8A through 8C are cross-sectional views for explaining movement of the mounting fixture 110 of FIG. 6, according to an embodiment of the present invention.

Referring to FIGS. 1 through 8C, the apparatus for visually inspecting and removing a foreign object in gaps of a bundle of heating tubes of an upper portion of a tube sheet of a secondary side of a steam generator is installed in a hand hole 'H' of an upper portion of one side of Westinghouse F-type steam generator disposed in an accommodation room, and includes the mounting fixture 110, a guide rail 120, a detector 130, a driver 140, a foreign object remover 150, a local controller 160, and a remote controller 170.

As illustrated in FIG. 3, the mounting fixture 110 is fixed to a flange surface of the hand hole 'H' by bolts 'S', and is used to stably fix and support the guide rail 120. As illustrated in FIGS. 6 and 7, the mounting fixture 110 includes a flange 111 having four bolts 'S' so as to fix the mounting fixture 110 to the flange surface of the hand hole 'H', a panning plate 112 whose front surface is coupled to the flange 111 so as to slide in a lateral direction of the flange 111, a tilting lever 113 hinged to a rear surface of the panning plate 112 so as to optionally tilt, a rail supporter 114 coupled to the tilting lever 113 so as to support the guide rail 120 that will be described, and two cable guides 115 disposed on a rear surface of the tilting lever 113 so as to stably accommodate cables from the detector 130 therein and to prevent the cables from the detector 130 from being entangled and damaged.

The mounting fixture 110 having the above-described structure may stably support the guide rail 120 so that the detector 130 may stably move along the guide rail 120.

In detail, the mounting fixture 110 may finely adjust a detection angle of the detector 130 by finely adjusting an angle of the guide rail 120. With regard to the mounting fixture 10, four screw holes 110a each having a circular shape, to which the bolts 'S' are inserted, are formed in four edges of the flange 111, respectively, so that the mounting fixture 10 is coupled to a steam generator 10. Thus, the mounting fixture 110 may roll in a direction indicated by an arrow of FIG. 8A by optionally rotating the flange 111 and then coupling the bolts 'S' to the screw holes 111a. The flange 111 and the panning plate 112 includes connectors 111b and 112a, respectively, which have corresponding shapes to each other and are formed on surfaces of the flange 111 and the panning plate 112, which come in contact with each other, as illustrated in FIG. 7. In addition, the flange 111 and the panning plate 112 are coupled by sliding them onto each other by the connectors 111b and 112a. The panning plate 112 may be moved in a direction (a horizontal direction) indicated by an arrow of FIG. 8B by control pins 116 disposed at both sides of the flange 111.

As illustrated in FIG. 7, the tilting lever 113 hinged to the rear surface of the panning plate 112 is coupled to hinge blocks 112b screwed to a lower portion of the panning plate 112 by pins 112c so as to optionally tilt. In this regard, the tilting lever 113 tilting with respect to the panning plate 112 includes a knuckle joint 117 having a first end in contact with the panning plate 112 and a second end having a screw thread formed thereon so as to optionally tilt with respect to the panning plate 112, and a control bolt 118 coupled to the screw thread formed on the second end of the knuckle joint 117. The control bolt 118 rotates around the knuckle joint 117 to push the knuckle joint 117, and then the tilting lever 113 may tilt in a direction indicated by an arrow of FIG. 8C.

In addition, the tilting lever 113 may include a pair of brackets 113a so that lateral surface portions of the rail supporter 114 may be supported by the brackets 113a. At this time, the rail supporter 114 may be coupled to the flange 111, the panning plate 112 and the tilting lever 113 so as to pass through the flange 111, the panning plate 112 and the tilting lever 113 in a horizontal direction. The guide rail 120, which will be described later, may be fixed to a lower portion of the rail supporter 114.

As illustrated in FIG. 3, the mounting fixture 110 having the above-described structure is stably fixed to the flange surface of the hand hole 'H' by bolts 'S', the guide rail 120 is coupled to the rail supporter 114, and then the detector 130, which will be described later, is inserted into the steam generator 10 along the guide rail 120. By this structure, sludge or foreign objects may be inspected.

At this time, the mounting fixture 110 may optionally roll due to the screw holes 111a of the flange 111. Simultaneously, the panning plate 112 may pan with respect to the flange 111 by coupling the connectors 111b and 112a, which have corresponding shapes to each other, by using a dovetail coupling method in which the connectors 111b and 112a are coupled by sliding them onto each other. In addition, simultaneously, the tilting lever 113 may tilt with respect to the panning plate 112 by hinging the panning plate 112 to the tilting lever 113. Thus, the rail supporter 114 coupled to the tilting lever 113 may rotate around the center of the hand hole 'H' right and left by about 10 to about 15 degrees, and may be finely adjusted in horizontal and vertical directions.

In addition, a horizontal and vertical level gage 119 may be installed on the rail supporter 114 so as to check a change in an angle of right and left rotation of the mounting fixture 110, and a change in an angle of horizontal and vertical movement of the mounting fixture 110, and thus a change in a movement angle of the mounting fixture 110 may be easily checked.

Figure 9:
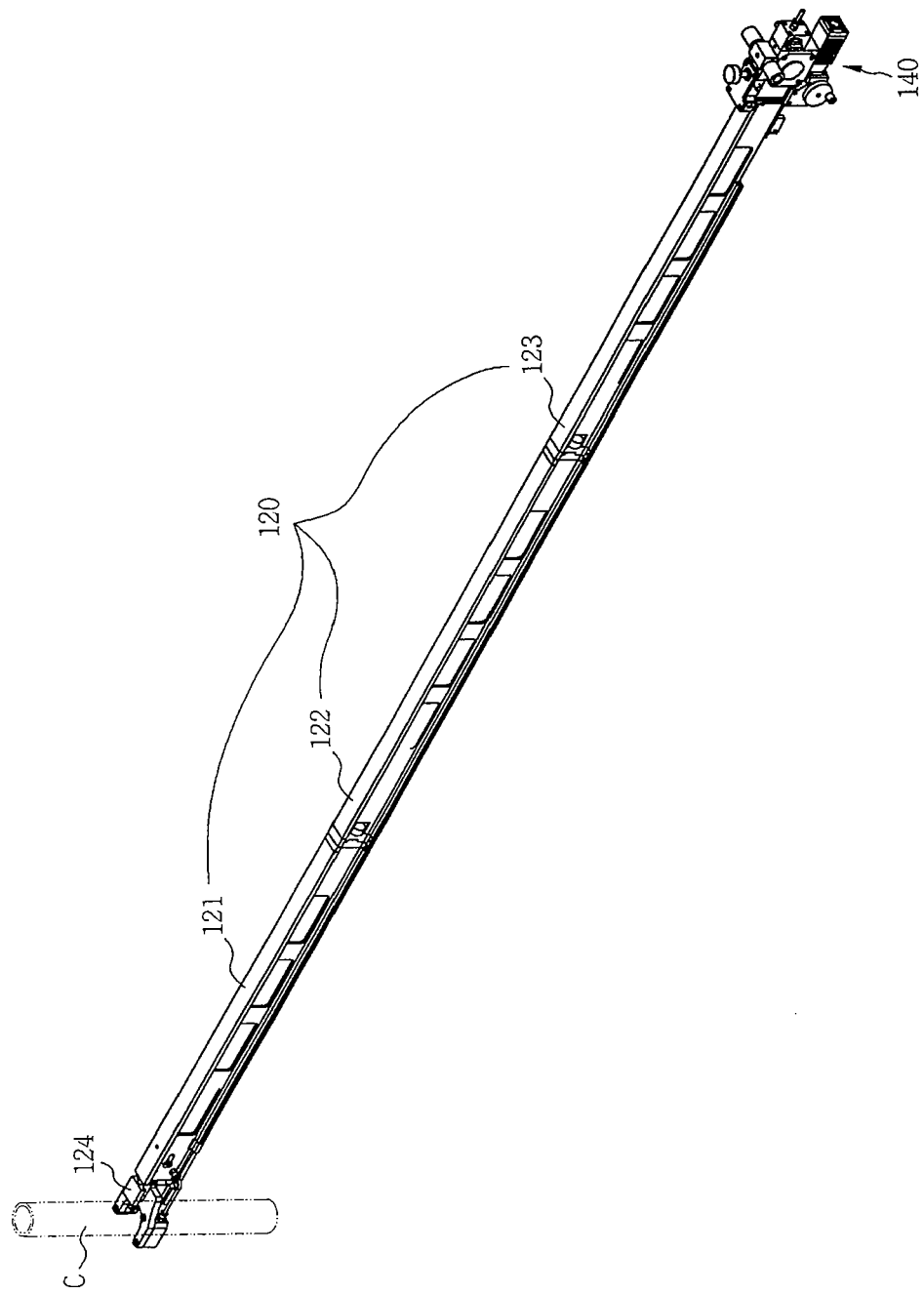
FIG. 9 is a schematic perspective view of a guide rail of an apparatus for visually inspecting and removing a foreign object in gaps of a bundle of heating tubes of an upper portion of a tube sheet of a secondary side of a steam generator, according to an embodiment of the present invention.
Figure 10:
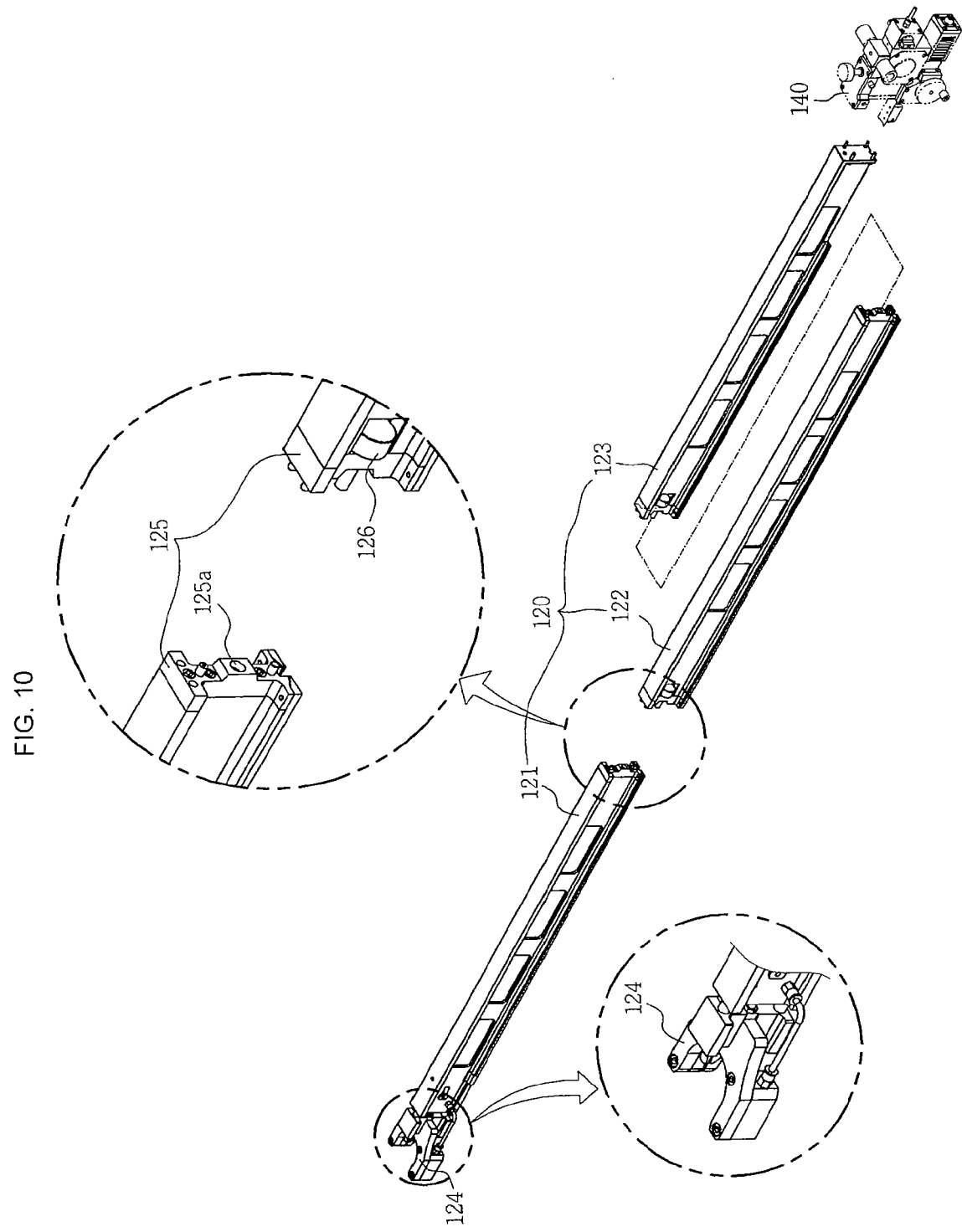
FIG. 10 is an exploded perspective view of the guide rail of FIG. 9.

FIG. 9 is a schematic perspective view of a guide rail 120 of an apparatus for visually inspecting and removing a foreign object in gaps of a bundle of heating tubes of an upper portion of a tube sheet of a secondary side of a steam generator, according to an embodiment of the present invention. FIG. 10 is an exploded perspective view of the guide rail 120 of FIG. 9.

A first end of the guide rail 120 is coupled to a center stay rod 'C' disposed at a central portion of the steam generator 10, and a second end of the guide rail 120 is coupled to the driver 140 that will be described later. The second end coupled to the driver 140 is fixed to the rail supporter 114 of the mounting fixture 110, thereby guiding the detector 130 that will be described later into the steam generator 10 (into the gap of a bundle of heating tubes).

As illustrated in FIG. 9, the guide rail 120 includes a plurality of rod-shaped rods with a predetermined length, wherein the rods may be separately coupled, and thus the length of the guide rail 120 may be extended or reduced. According to the present embodiment, the guide rail 120 includes three guide rods 121, 122 and 123.

In detail, as illustrated in FIG. 10, the guide rail 120 includes a first guide rod 121, a second guide rod 122 and a third guide rod 123. The first guide rod 121 includes a gripper 124 that is disposed at a first end of the first guide rod 121 so as to support and fix the center stay rod 'C' by tightening the center stay rod 'C', and a connecting block 125 that is formed at a second end of the first guide rod 121 and has a screw hole 125a so as to be coupled to the second guide rod 122.

The second guide rod 122 includes a clamping bolt 126 that is formed at a first end of the second guide rod 122 and is screwed to the screw hole 125a formed in the connecting block 125 so as to be coupled to the first guide rod 121, and a connecting block 125 that is formed at a second end of the second guide rod 122 and includes a screw hole 125a formed at the center of center of the connecting block 125 so as to be coupled to the third guide rod 123, like in the first guide rod 121.

In addition, the third guide rod 123 includes a clamping bolt 126 that is formed at a first end of the third guide rod 123 and is screwed to the screw hole 125a formed in the connecting block 125 of the second guide rod 122, like in the second guide rod 122, and the driver 140 supplying power is coupled to a second end of the third guide rod 123.

According to the present embodiment, the first, second and third guide rods 121, 122 and 123, that is, three guide rods constitute the guide rail. Alternatively, separate guide rods may be further used to extend or reduce the length of the guide rail 120, if necessary.

Figure 11:
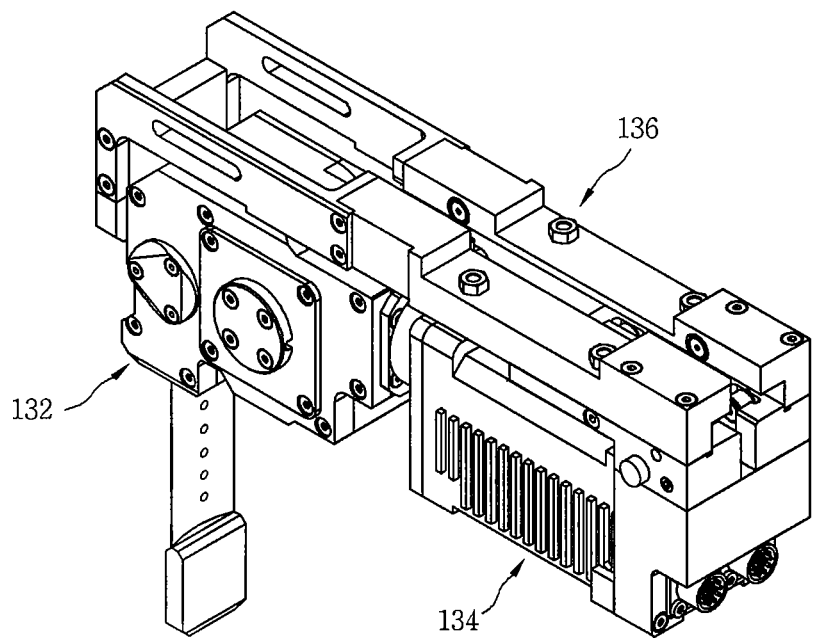
FIG. 11 is a perspective view of a detector of an apparatus for visually inspecting and removing a foreign object in gaps of a bundle of heating tubes of an upper portion of a tube sheet of a secondary side of a steam generator, according to an embodiment of the present invention.
Figure 12:
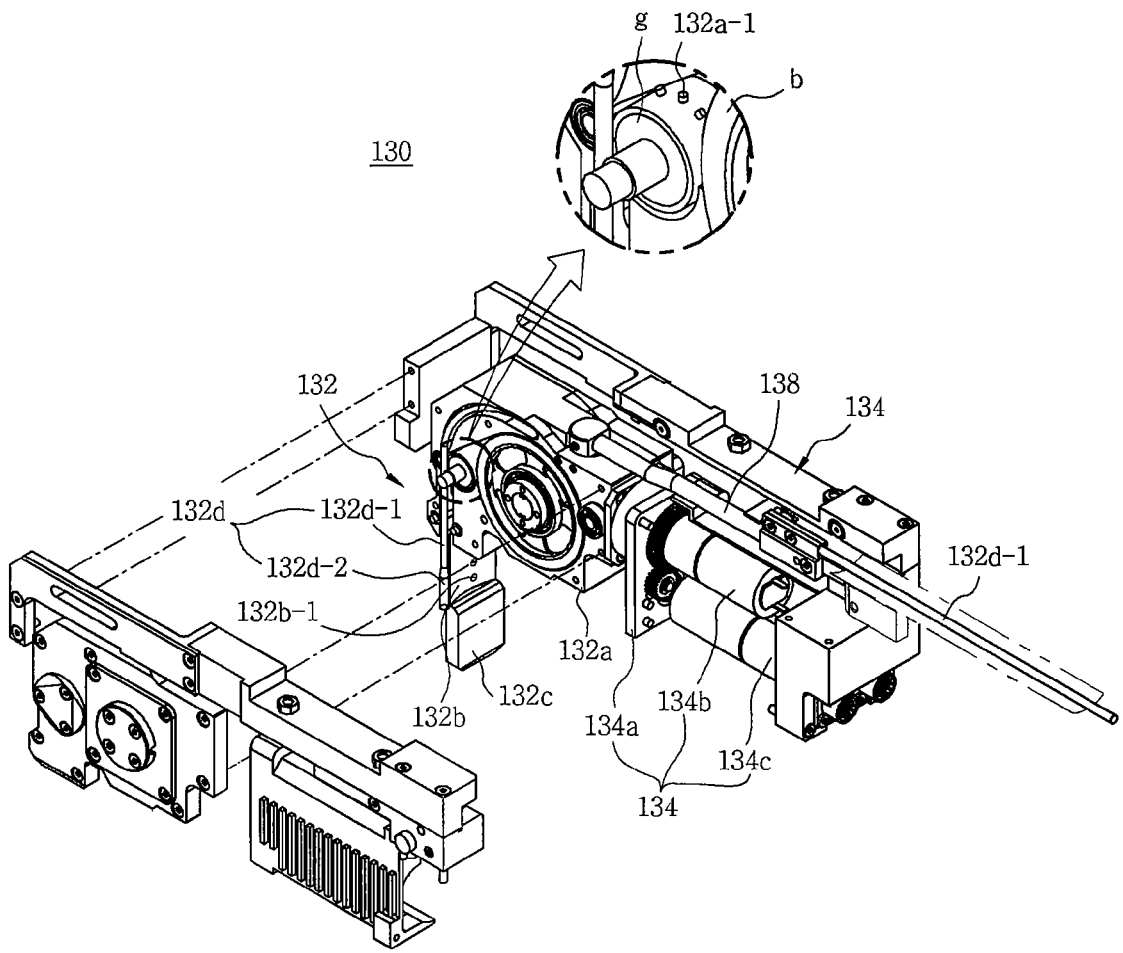
FIG. 12 is an exploded perspective view of the detector of FIG. 11.
Figure 13:
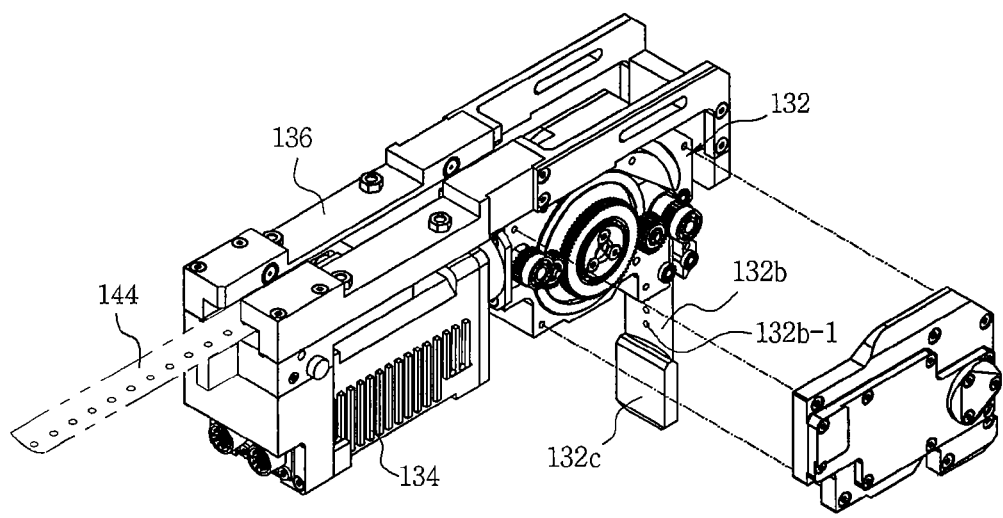
FIG. 13 is a schematic perspective view of a configuration of gears of a detecting portion of a detector of an apparatus for visually inspecting and removing a foreign object in gaps of a bundle of heating tubes of an upper portion of a tube sheet of a secondary side of a steam generator, according to an embodiment of the present invention.
Figure 14:
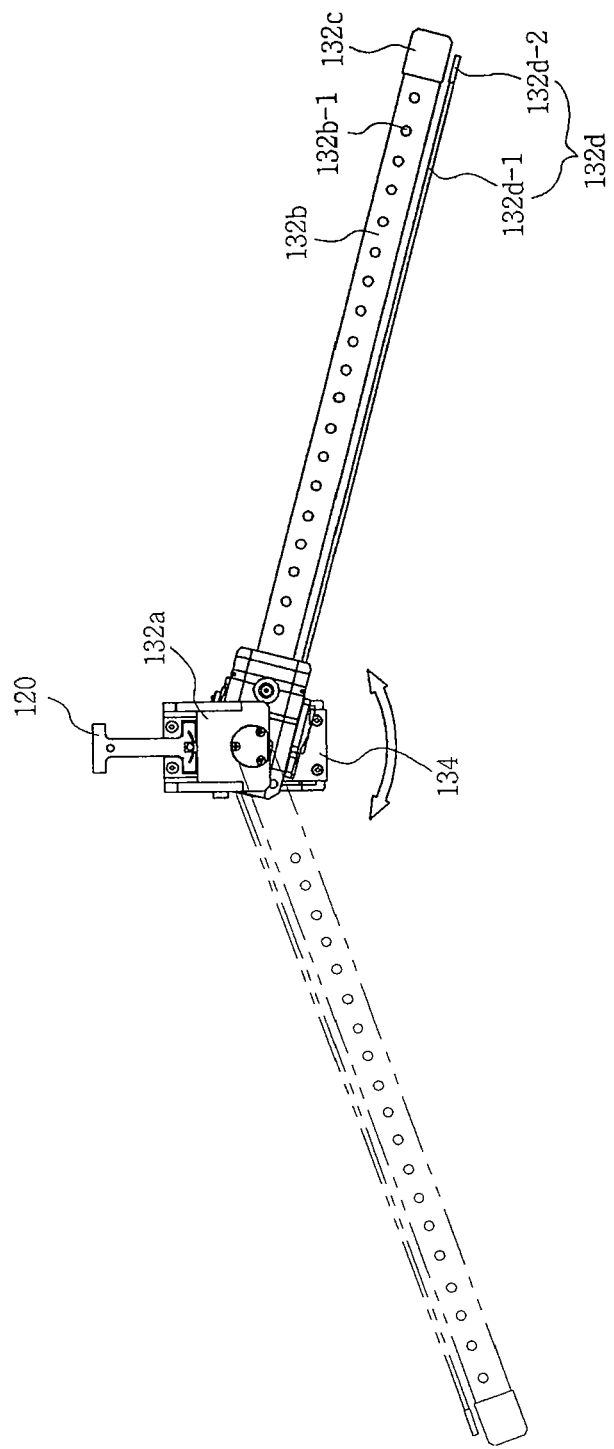
FIG. 14 is a front view for explaining a case where the detecting portion of the detector of FIG. 11 moves right and left, according to an embodiment of the present invention.
Figure 15:
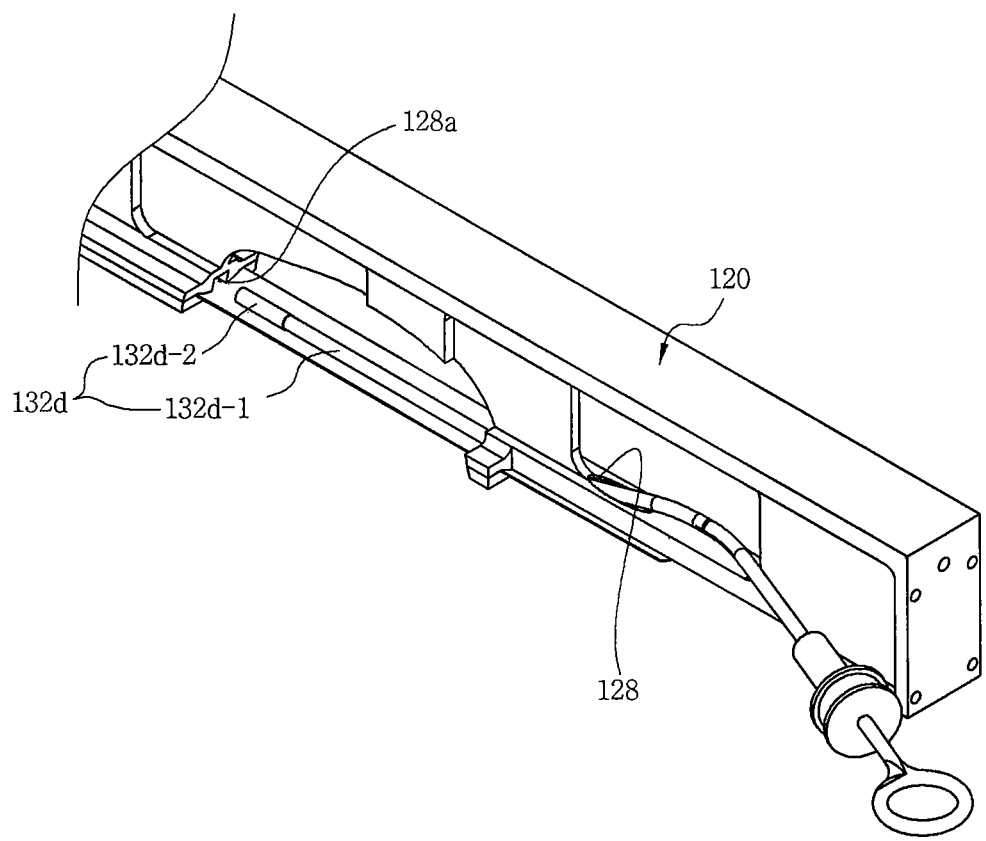
FIG. 15 is a perspective view for explaining a case where a foreign object remover is inserted into a guide rail, according to an embodiment of the present invention.
Figure 16:
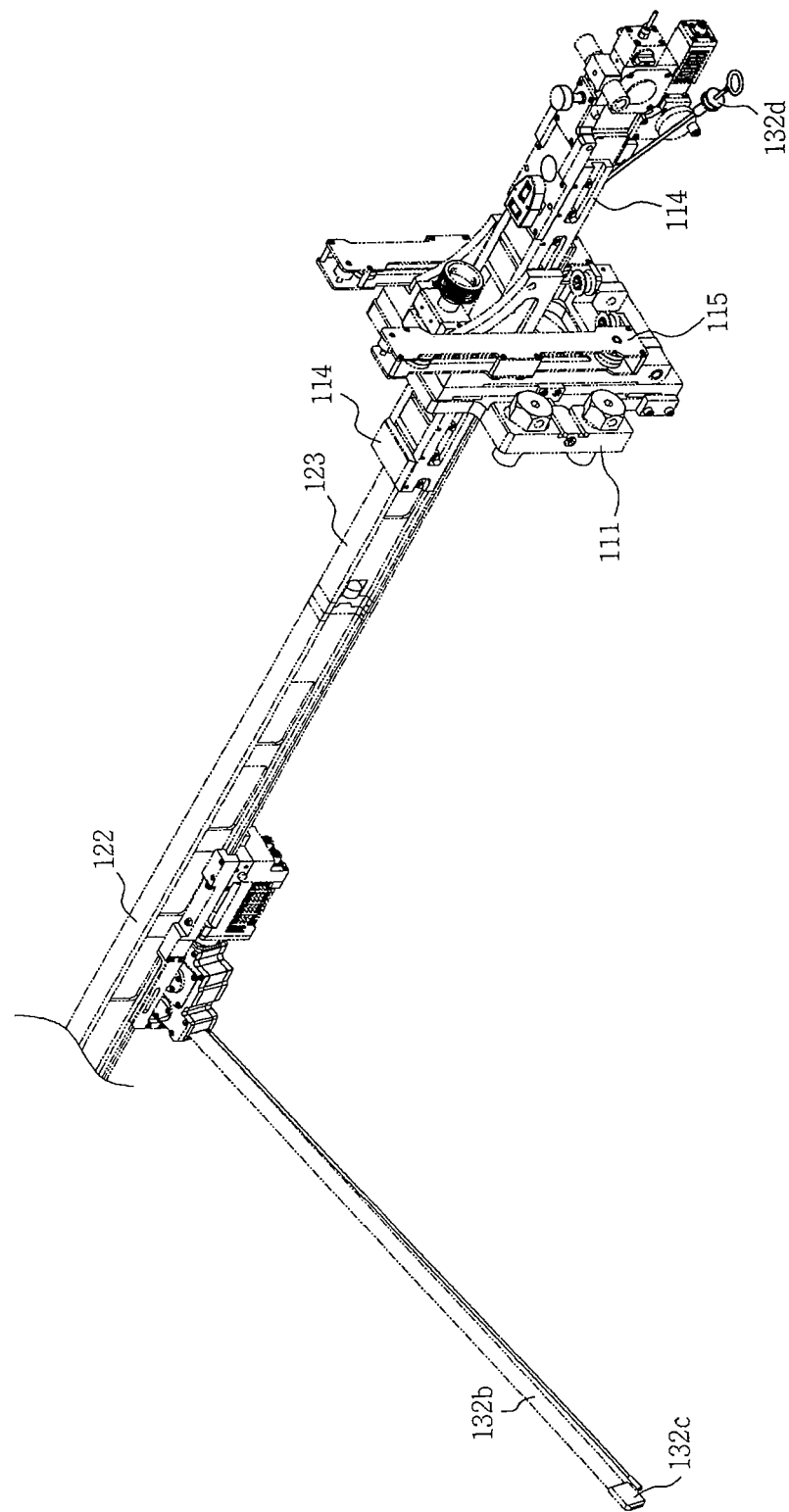
FIG. 16 is a reference diagram for explaining a case where the foreign object remover of FIG. 15 is installed, according to an embodiment of the present invention.

FIG. 11 is a perspective view of a detector 130 of an apparatus for visually inspecting and removing a foreign object in gaps of a bundle of heating tubes of an upper portion of a tube sheet of a secondary side of a steam generator, according to an embodiment of the present invention. FIG. 12 is an exploded perspective view of the detector 130 of FIG. 11. FIG. 13 is a schematic perspective view of a configuration of gears of a detecting portion 132 of a detector 130 of an apparatus for visually inspecting and removing a foreign object in gaps of a bundle of heating tubes of an upper portion of a tube sheet of a secondary side of a steam generator, according to an embodiment of the present invention. FIG. 14 is a front view for explaining a case where the detecting portion 132 of the detector 130 of FIG. 11 moves right and left, according to an embodiment of the present invention. FIG. 15 is a perspective view for explaining a case where a foreign object remover 132d is inserted into a guide rail 120, according to an embodiment of the present invention. FIG. 16 is a reference diagram for explaining a case where the foreign object remover 132d of FIG. 15 is installed, according to an embodiment of the present invention.

As illustrated in FIG. 5, the detector 130 may be coupled to a lower end of the guide rail 120 so as to slide onto the lower end of the guide rail 120, and may move forwards and backwards by the driver 140 that will be described later. Thus, the detector 130 is inserted into the steam generator 10 along the guide rail 120, and thus may visually inspect foreign objects, and may simultaneously remove foreign objects.

Referring to FIG. 11, the detector 130 may visually inspect or remove sludge or foreign objects. The detector 130 may include the detecting portion 132 rotating right and left, a detection driving portion 134 supplying power to the detecting portion 132 so as to drive the detecting portion 132, and a bracket portion 136 connecting the detecting portion 132 to the detection driving portion 134 so as to be coupled to the guide rail 120.

The detecting portion 132 inserted into gaps of the heating tubes in the steam generator 10 is installed in front of the bracket portion 136 so as to inspect or remove sludge or foreign objects. As illustrated in FIGS. 12 and 13, the detecting portion 132 includes a body 132a coupled to the bracket portion 136 and having a bobbin 'b' formed in the body 132a, a steel belt 132b disposed in the body 132a and having a first end wound on the bobbin 'b', a photographing sheet 132c coupled to a second end of the steel belt 132b and having an end at which a charge-coupled device (CCD) sensor and a light emitting display device (LED) are installed so as to generate a image signal of a visual inspection, and the foreign object remover 132d installed adjacent to the photographing sheet 132c so as to remove sludge and foreign objects, which are checked by the photographing sheet 132c.

As illustrated in FIG. 13, the body 132a is configured so that a plurality of gears are engaged to each other, wherein the bobbin 'b' rotates as the gears rotate. In addition, the steel belt 132b is configured to be wound or loosened by a clockwise or counter clockwise rotation from a state where an end of the steel belt 132b is wound on the bobbin 'b'. The body 132a includes an intermittent gear 'g' having a plurality of protrusions 132a-1 formed on a central portion thereof so that the steel belt 132b may be smoothly wound on the bobbin 'b'. The steel belt 132b includes a coupling hole 132b-1 into which the protrusions 132a-1 formed on the intermittent gear 'g' are inserted so that the steel belt 132b may be wound or loosened on the bobbin 'b' according to rotation of the intermittent gear 'g'. In addition, the steel belt 132b may be flexible so as to be easily wound or loosened on the bobbin 'b'.

The foreign object remover 132d is installed adjacent to and behind the photographing sheet 132c, and removes sludge or foreign objects detected by the photographing sheet 132c. In addition, the foreign object remover 132d includes a wire 132d-1 extended into or out of the body 132a of the detecting portion 132, and a foreign object removing tool 132d-2 installed at an end of the wire 132d-1 and having various shapes of a tong, a magnet, a ring, and the like.

As illustrated in FIGS. 15 and 16, an end of the foreign object remover 132d is inserted into a foreign object remover hole 128 formed in the guide rail 120, and passes along a foreign object remover groove 128a of the guide rail 120, which is manually performed by an operator when foreign objects are discovered. Then, as illustrated in FIG. 12, the wire 132d-1 is extended out of the detection driving portion 134, and then passes through a flexible tube 138 that will be described. Then, the wire 132d-1 together with the detecting portion 132 is inserted into the gaps of the heating tubes along a groove formed in the body 132a.

The detection driving portion 134 includes a housing 134a installed at a rear surface of the bracket portion 136, transferring a driving force to the detecting portion 132 and coupled to the bracket portion 136, a tilting motor 134c installed in the housing 134a and supplying power to the detecting portion 132 so as to rotate the detecting portion 132 towards both sides of the detecting portion 132, as illustrated in FIG. 14, and a feeding motor 134b supplying power so that the photographing sheet 132c of the detecting portion 132 may be extended or reduced out of the body 132a.

Although not illustrated, the tilting motor 134c rotates the body 132a in directions of both sides thereof through a spindle (not shown) disposed in the body 132a, and the feeding motor 134b coupled to a bevel gear (not shown) disposed in the body 132a rotates the intermittent gear 'g' and the bobbin 'b' so that the steel belt 132b may be wound into the body 132a.

The bracket portion 136 connecting the detecting portion 132 to the detection driving portion 134 may be formed so that an upper portion of the bracket portion 136 is coupled to a lower end of the guide rail 120, as illustrated in FIG. 14. In addition, the bracket portion 136 may be formed so as to slide on the guide rail 120. As illustrated in FIG. 12, the flexible tube 138 may be wound on the wire 132d-1 of the foreign object remover 132d so as to function as a guide used for the detecting portion 132 to smoothly rotate with respect to lateral surfaces of the bracket portion 136, and for the foreign object remover 132d to be smoothly extended in or out of the detecting portion 132 in a rotating direction of the detecting portion 132.

Figure 17:
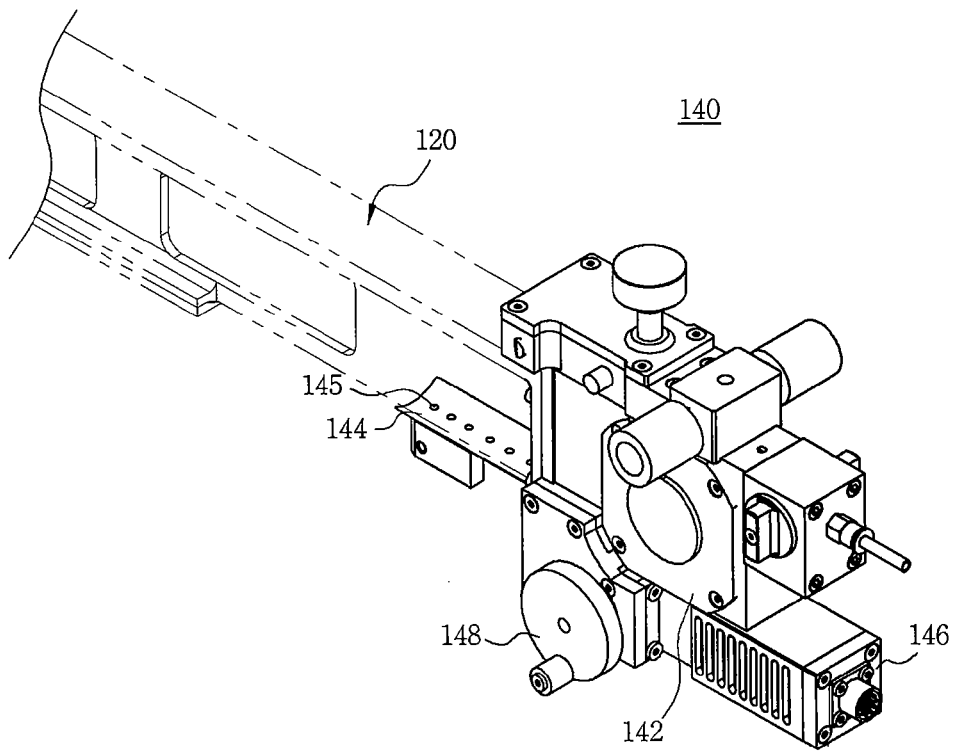
FIG. 17 is a perspective view of a driver, according to an embodiment of the present invention.
Figure 18:
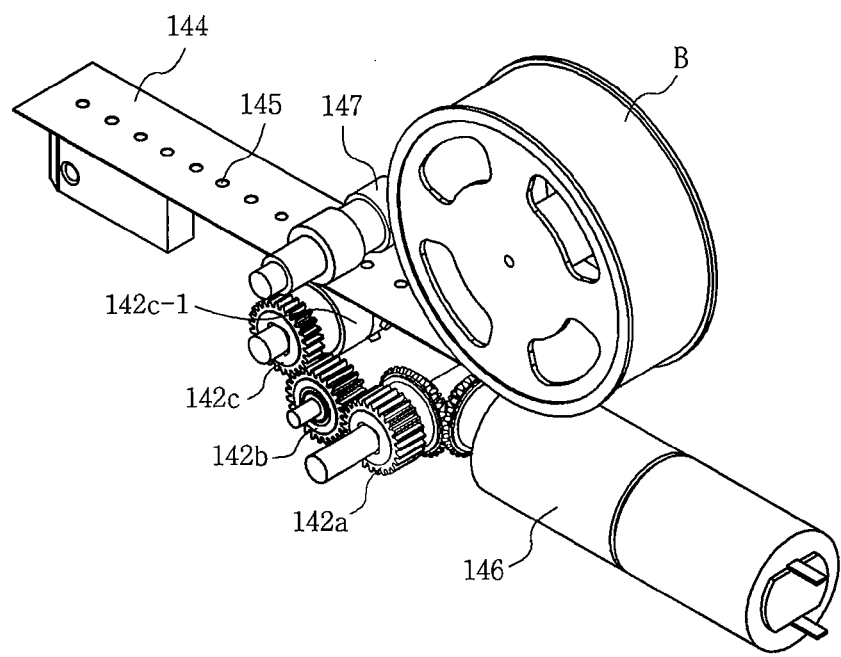
FIG. 18 is an exploded perspective view of the driver of FIG. 17.
Figure 19:
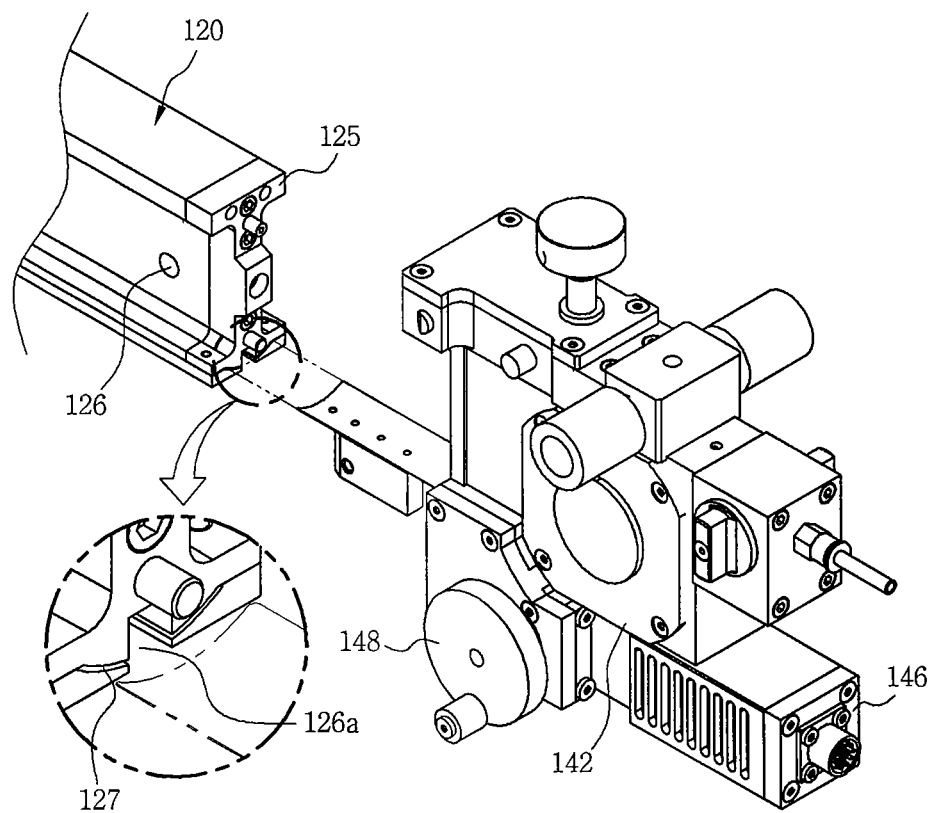
FIG. 19 is a reference diagram for explaining a case where a moving belt of a driver is inserted into a guide rail, according to an embodiment of the present invention.

FIG. 17 is a perspective view of the driver 140, according to an embodiment of the present invention. FIG. 18 is an exploded perspective view of the driver 140 of FIG. 17. FIG. 19 is a reference diagram for explaining a case where a moving belt 144 of the driver 140 is inserted into the guide rail 120, according to an embodiment of the present invention.

As illustrated in FIGS. 17 and 18, the driver 140 may be coupled to an end of the guide rail 120, for example, an end of the third guide rod 123 to which the mounting fixture 110 is coupled, may supply power to the detecting portion 132 so that the detecting portion 132 may be moved along the guide rail 120 into the steam generator 10, and may include a main housing 142, the moving belt 144, and a driving motor 146.

As illustrated in FIG. 17, an end of the main housing 142 is coupled to the guide rail 120, and simultaneously may be coupled to the rail supporter 114 of the mounting fixture 110. As illustrated in FIG. 18, the main housing 142 includes an intermittent gear 142c-1 engaged to a plurality of gears and having a plurality of protrusions formed on an outer circumference surface of the intermittent gear 142c-1, wherein the intermittent gear 142c-1 is engaged to a pinion gear 142c so as to drive the moving belt 144.

A first end of the moving belt 144 is wound on the bobbin 'b', and a second end of the moving belt 144 is coupled to the bracket portion 136 of the detector 130 so that the detector 130 may move along the guide rail 120. That is, as illustrated in FIG. 19, the first end of the moving belt 144 may be wound on the bobbin 'b', and the second end of the moving belt 144 may be coupled to the detector 130 through a guiding groove 127 formed in a lower portion of the guide rail 120 so that the detector 130 may move by as much as a length by which the moving belt 144 wound on the bobbin 'b' is loosened.

The driving motor 146 is engaged to a plurality of gears disposed in the main housing 142 so that the gears may be engaged to each other and may rotate as the driving motor 146 rotates. Thus, the protrusions of the intermittent gear 142c-1 engaged to the pinion gear 142c are coupled into a plurality of through holes 145 formed in the moving belt 144 so as to drive the moving belt 144, and thus the bobbin 'b' rotates so that the moving belt 144 may be wound or loosened on the bobbin 'b'.

In detail, with regard to the driver 140, the bobbin 'b' on which the moving belt 144 is wound, and a plurality of gears connected to a motor are disposed in the main housing 142, and thus the moving belt 144 is driven so as to rotate the bobbin 'b' clockwise and counter clockwise, as illustrated in FIG. 18. In addition, the gears are coupled to the driving motor 146 that are disposed at one side of the gears. As the driving motor 146 rotates, a gear 142c rotates. Then, the intermittent gear 142c-1 engaged to the gear 142c rotates so that the moving belt 144 wound on the bobbin 'b' may be wound or loosened so as to move the detector 130.

The gears installed in the main housing 142 includes a bevel gear 142a engaged to the driving motor 146, and the pinion gear 142c engaged to the bevel gear 142a through a needle gear 142b and engaged to the intermittent gear 142c-1 having a plurality of protrusions formed on an outer circumference surface of the intermittent gear 142c-1. When the driving motor 146 supplies power, the bevel gear 142a rotates, and therefore the pinion gear 142c engaged to the bevel gear 142a rotates so that the moving belt 144 may be wound on the bobbin 'b'.

As illustrated in FIG. 18, with regard to the moving belt 144, the through holes 145 are formed in a longitudinal direction of the moving belt 144 at predetermined intervals. intermittent gear 142c-1 of the pinion gear 142c may be inserted into the through holes 145 so that the moving belt 144 may be wound or loosened on the bobbin 'b' according to the rotation of the pinion gear 142c. A roller 147 pressurizing the moving belt 144 downwards is installed at an upper side of the pinion gear 142c so that the intermittent gear 142c-1 of the pinion gear 142c may be correctly inserted into the through holes 145 of the moving belt 144.

A handle 148 is installed at one side of the main housing 142 of the driver 140 so that a worker may manually wind or loosen the moving belt 144 on the bobbin 'b'. In an emergency, the bobbin 'b' may be rotated by manually rotating the handle 148, and thus the detector 130 may be moved.

Figure 20:
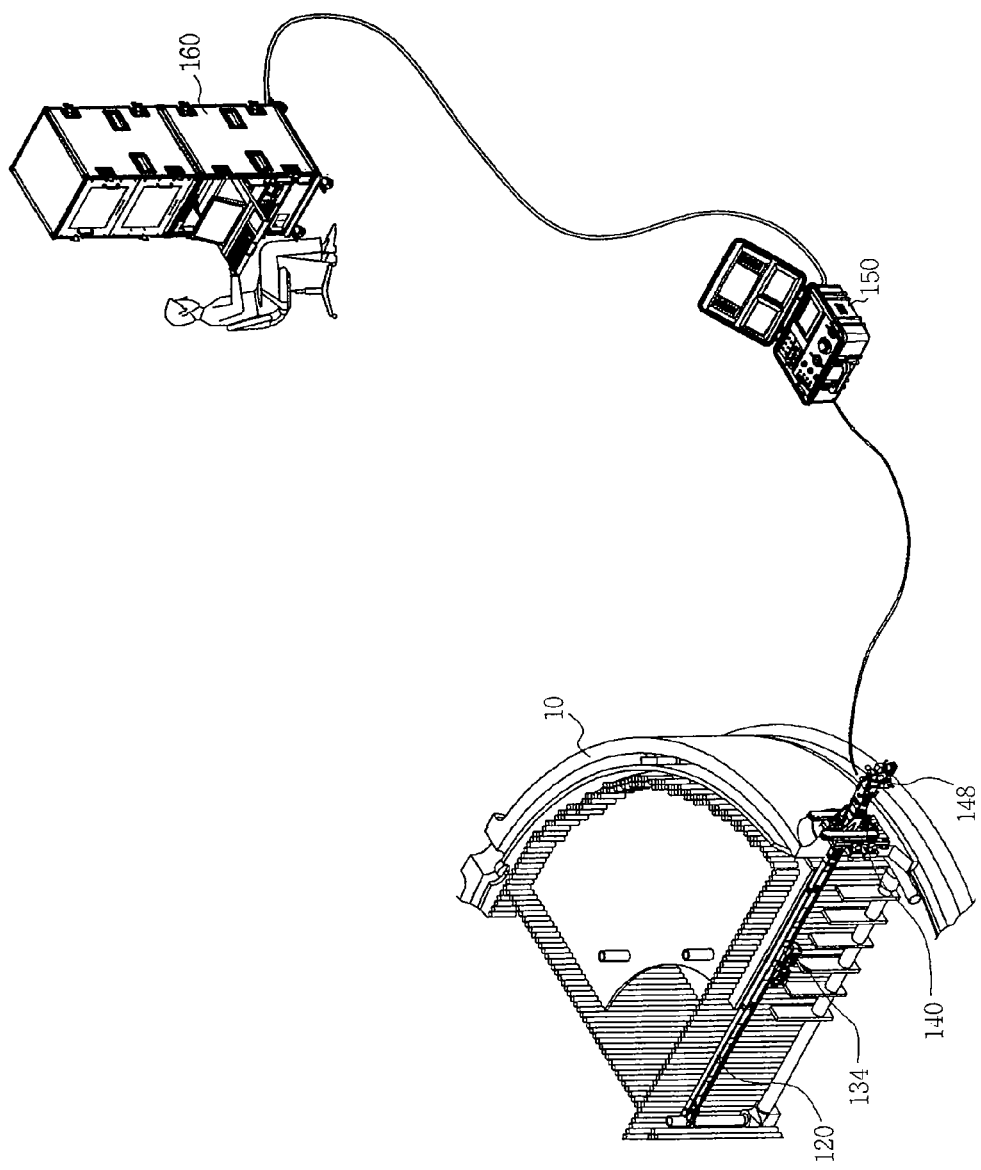
FIG. 20 is a diagram for explaining a case where an apparatus for visually inspecting and removing a foreign object in gaps of a bundle of heating tubes of an upper portion of a tube sheet of a secondary side of a steam generator is installed at a steam generator, according to an embodiment of the present invention.

FIG. 20 is a diagram for explaining a case where an apparatus for visually inspecting and removing a foreign object in gaps of a bundle of heating tubes of an upper portion of a tube sheet of a secondary side of a steam generator is installed at a steam generator 10, according to an embodiment of the present invention.

A local controller 150 is installed around the steam generator 10, and controls the mounting fixture 110, the guide rail 120, the detector 130, and the driver 140. The local controller 150 includes a monitor and a control panel. A remote controller 160 is positioned in an operating room remote from the steam generator 10 in order to avoid radioactivity from the steam generator 10. In addition, the remote controller 10 may perform automatic control using a special operating program, in addition to the same function as that of the local controller 150, and may record and edit visual inspection data. The local controller 150 and the remote controller 160 have general structures, and thus their detailed description will not be given here.

The apparatus for visually inspecting and removing a foreign object in gaps of a bundle of heating tubes of an upper portion of a tube sheet of a secondary side of a steam generator may operate as follows.

First, the mounting fixture 110 is installed on a flange surface of the hand hole 'H' of the steam generator 10.

The guide rail 120 on which the detector 130 and the driver 140 are previously mounted is coupled to the mounting fixture 110. Then, a first end of the guide rail 120 is fixed to the center stay rod 'C' installed at the center of the steam generator 10 by the gripper 124 that is disposed at the first end of the guide rail 120. At this time, the mounting fixture 110 is finely adjusted in horizontal and vertical directions by the control pins 116, a control bolt 118, and the like of the mounting fixture 110.

Then, a cable connected to the driver 140 is extended so as to connect the driver 140 to the local controller 150 installed adjacent to the steam generator 10 and the remote controller 160 installed out of a container, and thus foreign objects may be visually inspected and may be removed.

After the apparatus for visually inspecting and removing foreign object in gaps of an upper portion of a bundle of a tube sheet of a secondary side of a steam generator is installed, electricity is supplied to the driver 140 through the local controller 150 and the remote controller 160 so as to loosen the moving belt 144 wound on the bobbin 'b', and thus the detector 130 may be inserted into the steam generator 10 through the guide rail 120.

The body 132a of the detector 130 inserted into the steam generator 10 is rotated by the detection driving portion 134 in a desired direction, and then the bobbin 'b' and the intermittent gear 'g' may rotate so that the steel belt 132b is extended out of the body 132a. At this time, while the photographing sheet 132c is installed at an end of the steel belt 132b, the gap of the heating tube is inspected through a CCD camera installed at the photographing sheet 132c, and an image signal of this inspection is transmitted to the remote controller 160.

When foreign objects are discovered in the gap of the heating tube, a worker inserts the foreign object remover 132d installed on the detector 130 into the gap of the heating tube through the body 132a of the detecting portion 132.

According to the present invention, an apparatus for visually inspecting and removing a foreign object in gaps of a bundle of heating tubes of an upper portion of a tube sheet of a secondary side of a steam generator may visually inspect sludge and foreign objects in the gap of the heating tube disposed on the upper portion of the tube sheet of the secondary side of the steam generator, and simultaneously may remove foreign objects when foreign objects are discovered in the gap of the heating tube.

By performing an operation under high radioactivity by remote control, the amount of radioactivity exposed to a worker may be significantly reduced.

As described above, according to the present invention, although a technology used in an apparatus for visually inspecting and removing a foreign object in gaps of a bundle of heating tubes of an upper portion of a tube sheet of a secondary side of a steam generator is very simple, technological effects thereof is excellent.

Accordingly, according to the present invention, an apparatus for visually inspecting and removing a foreign object in gaps of a bundle of heating tubes of an upper portion of a tube sheet of a secondary side of a steam generator may visually inspect and simultaneously remove foreign objects effectively by inserting a detector visually-inspecting and optionally-removing foreign objects into the steam generator through a hand hole connected to an upper bundle of a secondary side of the steam generator.

In addition, due to a mounting fixture, a guide rail may be finely adjusted and stably supported in horizontal and vertical directions, and may be stably supported.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for visually inspecting and removing a foreign object in gaps of a bundle of heating tubes of an upper portion of a tube sheet of a secondary side of a steam generator, the apparatus comprising:
   a mounting fixture fixed to a flange surface of a hand hole of the steam generator by a bolt and having horizontal and vertical level gauges installed thereon, wherein the horizontal and vertical level gauges check a change in an angle of right and left rotation of the mounting fixture, and a change in an angle of horizontal and vertical movement of the mounting fixture;
   a guide rail of which one side is fixed to the mounting fixture, wherein a first end of the guide rail is coupled to a center stay rod disposed at a central portion of the steam generator, and a second end of the guide rail is coupled to a driver;
   a detector coupled to a lower end of the guide rail so as to slide on the lower end of the guide rail, inserted into the steam generator by a moving belt, and visually inspecting and removing a foreign object;
   the driver providing power so as to drive the detector, wherein one side of the driver is coupled to the guide rail, and is simultaneously coupled to a rail supporter of the mounting fixture; and
   local and remote controllers adjacent to the steam generator and controlling the mounting fixture, the detector and the driver; a flange having four bolts installed therein so as to fix the mounting fixture to the flange surface of the hand hole of the steam generator; a panning plate of which a front surface is coupled to the flange so as to slide in a lateral direction of the flange; a tilting lever hinged to a rear surface of the panning plate; the rail supporter coupled to the tilting lever and supporting the guide rail; and two cable guides disposed on a rear surface of the tilting lever so as to stably accommodate cables from the detector therein and to prevent the cables from being entangled and damaged.

2. The apparatus of claim 1, wherein the flange comprises screw holes formed therein into which the four bolts are inserted, respectively, so as to fix the mounting fixture to the flange surface of the steam generator, wherein the screw holes each having a circular shape are formed in four edges of the flange, and
   wherein the mounting fixture rolls by rotating the flange and then coupling the four bolts to the screw holes, respectively.

3. The apparatus of claim 1, wherein the flange and the panning plate comprises respective connectors, which have corresponding shapes to each other and are formed on surfaces of the flange and the panning plate, which come in contact with each other,
   wherein the flange and the panning plate are coupled by sliding the flange and the panning plate on each other, and
   wherein the panning plate moves right and left by a control pin disposed at both sides of the flange.

4. The apparatus of claim 1, wherein the tilting lever comprises:
   a knuckle joint having a first end in contact with the panning plate, and a second end with a screw thread formed thereon; and
   a control bolt coupled to the screw thread formed on the second end of the knuckle joint,
   wherein the tilting lever tilts by a manner in which the control bolt rotates around the knuckle joint to push the knuckle joint.

5. The apparatus of claim 1, wherein the guide rail functions as a guide of the detector, and comprises a plurality of rod-shaped guide rods that are separately coupled to each other.

6. The apparatus of claim 5, wherein the guide rail comprises:
   a first guide rod comprising a gripper that is disposed at a first end of the first guide rod so as to support and fix the center stay rod of the steam generator to the guide rail by tightening the center stay rod, and a connecting block having a screw hole and formed at a second end of the first guide rod;
   a second guide rod comprising a clamping bolt that is disposed at a first end of the second guide rod and is screwed to the screw hole formed in the connecting block so as to be coupled to the first guide rod, and a connecting block disposed at a second end of the second guide rod and having a screw hole formed in the connecting block; and
   a third guide rod comprising a clamping bolt that is disposed at a first end of the third guide rod and is screwed to the screw hole formed in the connecting block so as to be coupled to the second guide rod, wherein the driver is coupled to a second end of the third guide rod.

7. The apparatus of claim 5, further comprising a guiding groove formed in a lower portion of the guide rail, wherein the moving belt is inserted into the guiding groove.

8. The apparatus of claim 1, wherein the detector comprises:

a detecting portion visually-inspecting and removing sludge or a foreign object in the steam generator, comprising a photographing sheet and a foreign object remover, and rotating right and left;
a detection driving portion providing power so as to drive the detecting portion; and
a bracket portion connecting the detecting portion to the detection driving portion so as to be coupled to the guide rail.

9. The apparatus of claim 8, wherein the detecting portion comprises:
a body installed in front of the bracket portion and comprising a bobbin disposed in the body;
a steel belt disposed in the body and having a first end wound on the bobbin;
the photographing sheet coupled to a second end of the steel belt and having an end at which a charge-coupled device (CCO) sensor and a light emitting display device (LED) are installed so as to generate an image signal of a visual inspection; and
the foreign object remover installed adjacent to the photographing sheet so as to remove a foreign object checked by the photographing sheet.

10. The apparatus of claim 9, wherein the steel belt comprises a plurality of coupling holes formed in a center of the steel belt in a longitudinal direction of the steel belt at predetermined intervals, and
wherein the steel belt is wound into the body according to rotation of the bobbin and an intermittent gear having a plurality of protrusions formed on an outer circumference surface of the intermittent gear, wherein the intermittent gear and the bobbin are disposed in the body.

11. The apparatus of claim 8, wherein the detection driving portion comprises:
a housing installed at a rear surface of the bracket portion, transferring a driving force to the detecting portion, and coupled to the bracket portion;
a tilting motor installed in the housing and supplying power to the detecting portion so as to rotate the detecting portion towards both sides of the detecting portion; and
a feeding motor supplying power so that the photographing sheet and the foreign object remover of the detecting portion are extended or reduced out of the body.

12. The apparatus of claim 8, wherein the driver comprises:
a main housing having an end coupled to the guide rail and simultaneously coupled to the rail supporter of the mounting fixture, and comprising a bobbin disposed in the main housing and rotated by a plurality of gears;
the moving belt having a first end wound on the bobbin and a second end coupled to the bracket portion of the detector so as to move along the guide rail; and
a driving motor rotating the bobbin disposed in the main housing so that the moving belt is wound or loosened and the detector is moved.

13. The apparatus of claim 12, wherein the main housing comprises a
pinion gear engaged to an intermittent gear having a plurality of protrusions formed on an outer circumference surface of the intermittent gear,
wherein the moving belt comprises a plurality of through holes formed therein in a longitudinal direction at predetermined intervals, and
wherein the plurality of protrusions of the intermittent gear engaged to the pinion gear are inserted into the plurality of through holes so that the moving belt is wound or loosened on the bobbin.

14. The apparatus of claim 13, further comprising a roller disposed in
the main housing and pressurizing the moving belt downwards so that the plurality of protrusions of the intermittent gear engaged to the pinion gear are correctly inserted into the plurality of through holes of the moving belt.

* * * * *